(12) United States Patent
Sanderford, Jr. et al.

(10) Patent No.: US 7,706,745 B2
(45) Date of Patent: Apr. 27, 2010

(54) METHOD, SYSTEM, APPARATUS, AND COMPUTER PROGRAM PRODUCT FOR COMMUNICATIONS RELAY

(75) Inventors: H. Britton Sanderford, Jr., New Orleans, LA (US); Marc L. Reed, Manderville, LA (US)

(73) Assignee: M&FC Holding, LLC, Pittsburgh, PA (US)

( * ) Notice: Subject to any disclaimer, the term of this patent is extended or adjusted under 35 U.S.C. 154(b) by 1148 days.

(21) Appl. No.: 11/293,313

(22) Filed: Dec. 5, 2005

(65) Prior Publication Data
US 2006/0165044 A1 Jul. 27, 2006

Related U.S. Application Data

(60) Provisional application No. 60/634,548, filed on Dec. 10, 2004, provisional application No. 60/632,662, filed on Dec. 3, 2004.

(51) Int. Cl.
*H04B 7/15* (2006.01)
(52) U.S. Cl. .................... 455/11.1; 455/12.1; 455/13.1; 370/315; 370/316
(58) Field of Classification Search ............... 455/11.1, 455/13.1, 16, 12.1, 13.2, 427, 98; 370/226, 370/243, 246, 274, 279, 293, 315, 316, 492, 370/501
See application file for complete search history.

(56) References Cited

U.S. PATENT DOCUMENTS

| | | | |
|---|---|---|---|
| 4,479,245 A * | 10/1984 | Batlivala et al. ............... 455/18 |
| 4,490,818 A * | 12/1984 | Otsuka ....................... 370/279 |
| 4,799,062 A | 1/1989 | Sanderford, Jr. et al. |
| 4,977,577 A | 12/1990 | Arthur et al. |
| 5,067,136 A | 11/1991 | Arthur et al. |
| 5,095,493 A | 3/1992 | Arthur et al. |
| 5,311,541 A | 5/1994 | Sanderford, Jr. |
| 5,377,222 A | 12/1994 | Sanderford, Jr. |
| 5,396,648 A * | 3/1995 | Patsiokas et al. ............ 455/509 |
| 5,457,713 A | 10/1995 | Sanderford, Jr. et al. |
| 5,598,427 A | 1/1997 | Arthur et al. |
| 5,652,592 A | 7/1997 | Sanderford et al. |
| 5,668,828 A | 9/1997 | Sanderford, Jr. et al. |
| 5,717,406 A | 2/1998 | Sanderford et al. |
| 5,742,635 A | 4/1998 | Sanderford, Jr. |
| RE35,829 E | 6/1998 | Sanderford, Jr. |
| 5,764,686 A | 6/1998 | Sanderford et al. |
| 5,859,869 A | 1/1999 | Sanderford |
| 5,917,449 A | 6/1999 | Sanderford et al. |
| 5,920,589 A | 7/1999 | Rouquette et al. |
| 5,926,531 A | 7/1999 | Petite |
| 5,953,368 A | 9/1999 | Sanderford et al. |
| 5,987,058 A | 11/1999 | Sanderford et al. |
| 5,999,561 A | 12/1999 | Naden et al. |

(Continued)

*Primary Examiner*—Duc Nguyen
*Assistant Examiner*—Dominic E Rego
(74) *Attorney, Agent, or Firm*—Oblon, Spivak, McClelland, Maier & Neustadt, L.L.P.

(57) ABSTRACT

A method, system, apparatus, and computer program product for relaying packet information from an Out of Range Device (ORD) to a communications tower. The method includes transmitting a message from the ORD. The message is recognizable by a transceiver device as a message to be repeated. The message is stored in the transceiver device which also measures a received signal quality of the message, and relays the message after delaying for a time interval inversely proportional to received signal quality.

33 Claims, 3 Drawing Sheets

U.S. PATENT DOCUMENTS

| | | | |
|---|---|---|---|
| 6,028,522 | A | 2/2000 | Petite |
| 6,031,883 | A | 2/2000 | Sanderford, Jr. et al. |
| 6,044,062 | A | 3/2000 | Brownrigg et al. |
| 6,084,547 | A | 7/2000 | Sanderford et al. |
| 6,111,911 | A | 8/2000 | Sanderford, Jr. et al. |
| 6,218,953 | B1 | 4/2001 | Petite |
| 6,233,327 | B1 | 5/2001 | Petite |
| 6,249,516 | B1 | 6/2001 | Brownrigg et al. |
| 6,335,953 | B1 | 1/2002 | Sanderford, Jr. et al. |
| 6,430,268 | B1 | 8/2002 | Petite |
| 6,437,692 | B1 | 8/2002 | Petite et al. |
| 6,618,578 | B1 | 9/2003 | Petite |
| 6,628,764 | B1 | 9/2003 | Petite |
| 6,671,586 | B2 | 12/2003 | Davis et al. |
| 6,718,158 | B1 * | 4/2004 | Suonvieri ............... 455/9 |
| 6,747,557 | B1 | 6/2004 | Petite et al. |
| 6,784,807 | B2 | 8/2004 | Petite et al. |
| 6,836,737 | B2 | 12/2004 | Petite et al. |
| 6,862,498 | B2 | 3/2005 | Davis et al. |
| 6,891,838 | B1 | 5/2005 | Petite et al. |
| 6,914,533 | B2 | 7/2005 | Petite |
| 6,914,893 | B2 | 7/2005 | Petite |
| 6,931,445 | B2 | 8/2005 | Davis |
| 7,230,935 | B2 * | 6/2007 | Proctor et al. ............ 370/315 |
| 2002/0042283 | A1 * | 4/2002 | Moulsley ............... 455/517 |
| 2002/0123276 | A1 * | 9/2002 | Peetz ................... 439/894 |
| 2003/0153267 | A1 * | 8/2003 | Karabinis ............. 455/13.1 |
| 2004/0044987 | A1 * | 3/2004 | Kompalli et al. ........ 717/100 |
| 2004/0114545 | A1 * | 6/2004 | Edwards ................ 370/294 |
| 2005/0041626 | A1 * | 2/2005 | Tiirola et al. ............ 370/335 |
| 2006/0046646 | A1 * | 3/2006 | Couper ................ 455/11.1 |
| 2007/0224931 | A1 * | 9/2007 | Fitton et al. ................ 455/7 |
| 2009/0103509 | A1 * | 4/2009 | Sanderford et al. ...... 370/343 |

* cited by examiner

ORD (two-way or optionally one-way with no receiver) or BUDDY BLOCK DIAGRAM

REPEATED MESSAGE EXPONENTIAL TRAFFIC REDUCTION

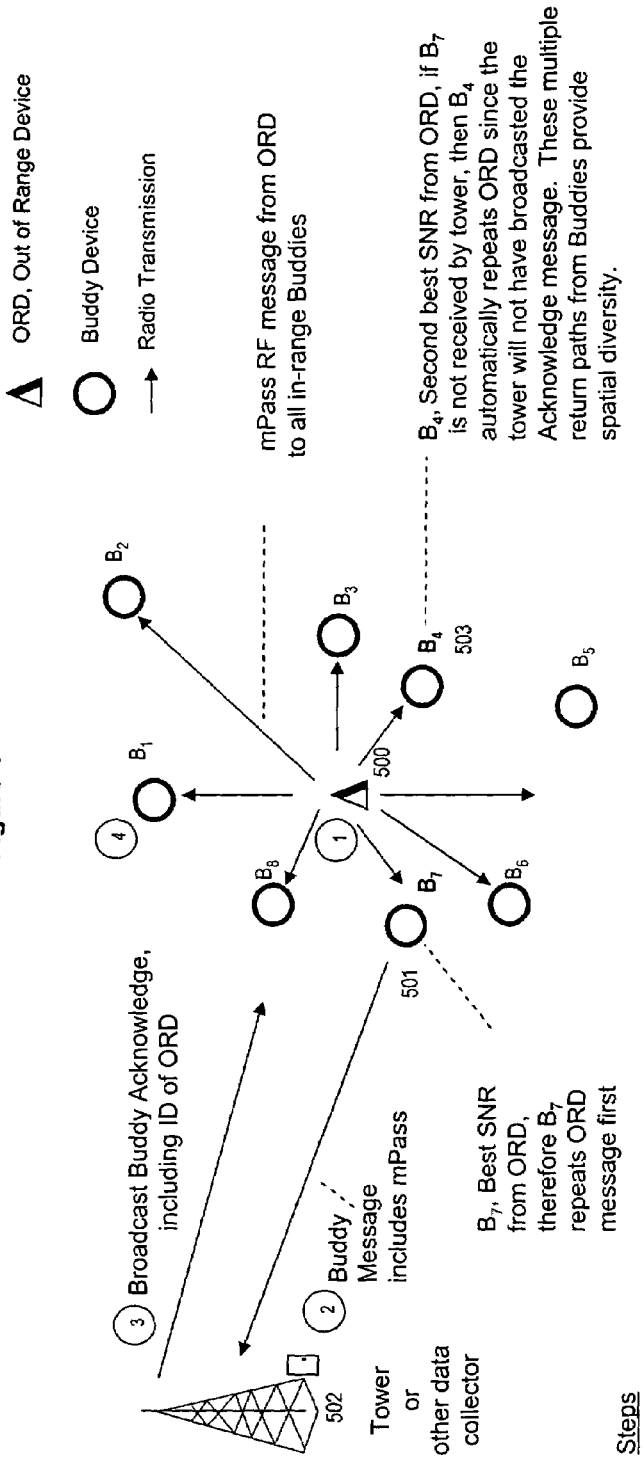

METHOD, SYSTEM, APPARATUS, AND COMPUTER PROGRAM PRODUCT FOR COMMUNICATIONS RELAY

CROSS REFERENCE TO RELATED APPLICATIONS

The present application is related to and incorporates by reference each of the following granted U.S. patents: U.S. Pat. Nos. 5,598,427; 5,987,058; 5,953,368; 4,977,577; 5,067,136; 5,095,493; 5,408,217; 5,311,541; 5,119,396; 5,265,120; 6,111,911; 5,668,828; 5,920,589; 5,457,713; 6,031,883; 5,999,561; 6,639,939; and 6,335,963, The present application is also related to and incorporates by reference each of the following pending patent applications: U.S. patent application Ser. Nos. 09/720,270 and 10/662,530.

BACKGROUND OF THE INVENTION

1. Field of Invention

A method, system, apparatus, and computer program product for efficiently relaying information through a wireless radio network.

2. Discussion of the Background

Wireless communications have been adapted for many commercial uses. One use concerns the collection and relay of data from a distributed set of sensors to a central processing facility via one or more transmission and collector towers. In conventional systems, a sensor (e.g., a commercial utility power usage meter or other remote sensor) is connected to a wireless transmitter. The transmitter relays information to a central account facility via a collector tower. The collector may be as part of a radio tower, mounted on a roof top, power poll top or other easement; it may also be mounted in or on a home or commercial building. The preferred embodiment utilizes a tower because it develops the greater range and therefore the lowest cost infrastructure. The transmission time may be random or scheduled. If one or more transmitters are located out of range of the collector tower, repeaters are placed in one or more locations to receive and relay the transmission. Due to cost considerations, these repeaters may not be full duplex devices. That is, the repeaters operate on a schedule where for a portion of time the repeater listens for a broadcast and then for another portion of time the repeater transmits whatever has been relayed. Additional periods exist where the repeater is neither receiving nor transmitting. Full Duplex repeats have the disadvantage of utilizing both receive and transmit bandwidth thus doubling the need of limited RF spectrum to operate the system.

The conventional system utilizing repeaters is characterized by an inefficient flooding of information. That is, information sent by a sensor/transmitter may be received directly by a relay tower and still be repeated by one or more repeaters, therefore wasting the system's RF data capacity.

A certain species of networks called mesh will relay a message through a multiple series of assigned 2-way distributed radio devices. Typically each node may communicate to any other in-range node. This method is intended to extend the reach of a RF signal by creating a routing list stored in communications nodes which may convey a data packet, like a bucket brigade. Such systems typically seek learn the best rout over time and can adapt to changes in the RF environment. If a node fails, such systems seek to self heal by re-routing to the next best set of path nodes. The draw back to this art is the complexity of the distributed data bases required to rout, re-rout, and adapt to a constantly changing RF environment. The temporal coherence at 900 MHz for example is 10 ms; therefore optimal paths may change 100 times a second. Further, RF jamming in the 902 to 928 MHz bands will cause a large amount of path re-routing. A further draw-back is that re-routing uses valuable RF data capacity required for mesh systems to exchange routing lists and to append routing paths to every data message. In addition since any RF transmission propagates not only to an intended node but to all others in range, all redundancy in a mesh causes a proportionate reduction in available RF data bandwidth. Mesh systems must have path memory, change the state of that memory based on changing RF conditions and have a time delay to make that change. In control theory this is a difficult system to make unconditionally stable. Each additional state that a system has exponentially increases its possible failure modes.

Thus, what is desired, as recognized by the present inventors, is an efficient, stable method to selectively relay information within a wireless transmission network that captures the benefits of mesh networking without the inherent risks and deficiencies that are associated conventional mesh networks.

SUMMARY OF INVENTION

A method, system, apparatus, and computer program product for relaying packet information from an Out of Range Device (ORD) to a communications tower or collector. The method includes transmitting a message from the ORD. The message is recognizable by a Buddy transceiver device as a message to be repeated. The message is stored in the Buddy transceiver device which also measures the received signal strength of the message from the ORD, signal to noise ratio (SNR) or like measurement of signal quality (signal quality). The Buddy then relays the message after delaying for a time interval inversely proportional to received signal quality. The communications tower or collector then broadcasts an Acknowledgment message. Upon receiving the Acknowledgment message, the Buddies with a pending message from the ORD of that same identification discard the pending ORD message. This method utilizes minimum RF capacity, is 100% adaptive always choosing the best route, while requiring no path routing memory states which can become stale, unstable or corrupted.

BRIEF DESCRIPTION OF THE FIGURES

FIG. 4 is a network diagram associated with the present invention.

DETAILED DESCRIPTION OF THE INVENTION

Figure 1:
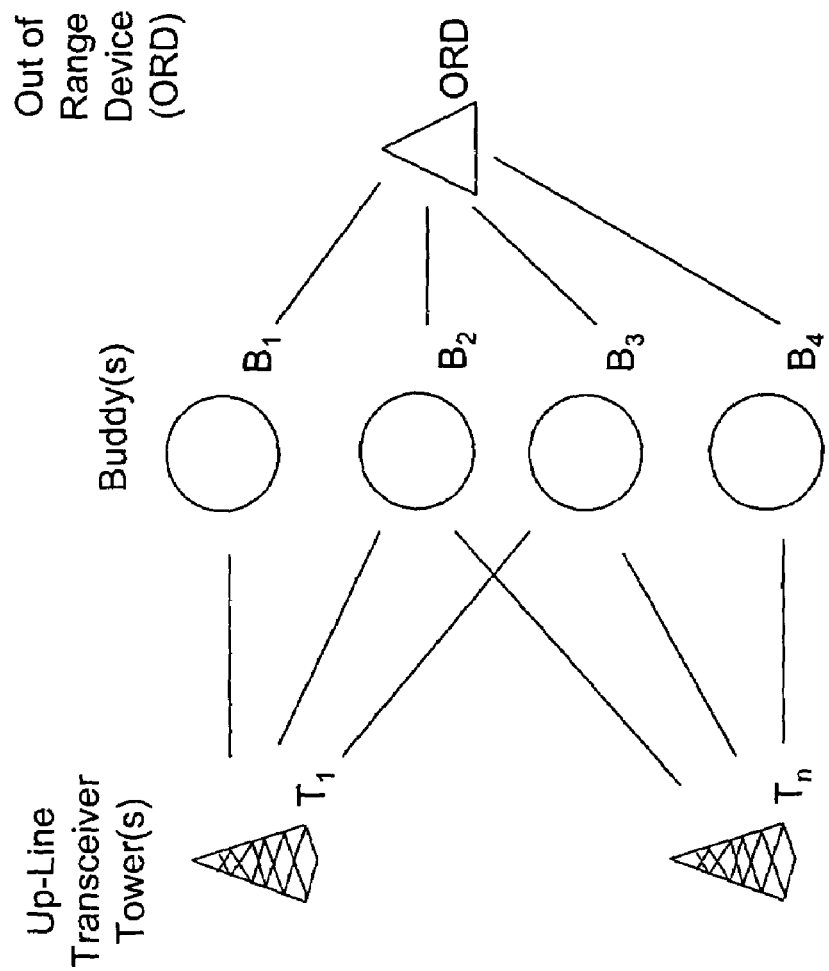
FIG. 1 is an architectural overview of an embodiment of the present invention.

One embodiment of the present invention includes a system for receiving and relaying measurement data from a deployed set of independent sensors to a central processing facility via one or more communications towers or collectors. Each sensor is coupled with a wireless communications device. The communications device includes a transmitter having two modes of operation, a 'normal' mode and, a special 'mPass' mode. The communications device also includes a receiver and receiver queue. Other components include those for receiving, storing, encoding and transmitting local measurement data. Data transmitted also includes a unique device identification number.

When in 'normal' mode, the communications device periodically or randomly sends the sensor data directly to a relay tower or collector. When in mPass mode, the communications device periodically or randomly sends the sensor data to a relay tower or collector via another device (a.k.a. a 'buddy' device). The buddy device may be a peer sensor/communications device or may be another device configured to receive and relay a transmission. In one embodiment, the mode of operation is set by an operator upon installation. In another embodiment, the mode of operation is set or changed via a wireless command. In another mode of operation, a device may autonomously elect to enter into mPass mode as a result of loss of communication with a tower or collector. A device operating in the mPass mode is usually out of range of a relay tower or collector. Out of range devices, ORDs, can be either capable only of transmitting or of transmitting and receiving from a wireless communications standpoint. For example a wireless water or gas meter need only operate as transmit-only devices, thus lowering their complexity and cost and increasing their battery life.

The normal and mPass modes may differ in frequency, modulation, and/or message format. Other features may also distinguish the normal and special modes of operation.

Each sensor/communications device configured to be a buddy device (i.e., configured to relay data from another device) naturally includes a receiver configured to receive a special mode transmission. The buddy device also includes a queue configured to hold one or more messages received from one or more devices operating in the special mode.

Each buddy device also is configured to measure the signal quality of an incoming special mode message, including but not limited to signal strength, SNR, receiver quieting, BER, packet success rate, or modulation "eye". The timing of when the incoming message is relayed is controlled by a control device that determines whether the incoming signal's signal quality is above or below one or more thresholds. If the signal quality is above the highest threshold, the buddy device will relay the incoming signal more quickly than if the signal quality is below the highest threshold. One or more thresholds may be used. In the preferred embodiment, retransmission delay is inversely proportional to the received signal quality. To avoid collisions between two or more buddy transmissions, each buddy device also may optionally apply an additional random timing delay (a.k.a. jitter) to the threshold determined delay.

Any two way device in the wireless network may be capable of autonomously acting as a buddy device while carrying out its normal sensing functions. In two way end-points, normal sensing functions supersede buddy functions during operation.

The system also includes one or more relay towers or collectors configured to receive the normal and relayed transmissions. At a predetermined time after a relayed transmission is received at a tower or collector from a buddy device, the tower/collector broadcasts an acknowledgement which includes the device identification of the device operating in the special mode. All devices which receive the acknowledgement examine their queue of received messages. If a message in queue corresponds to the device ID included in the acknowledgement message, the message is deleted from the queue. Thus, unnecessary broadcasts and unwanted collisions are avoided.

The tower or collector is configured to send the acknowledgement (including the device ID) within a predetermined acknowledgement time. The predetermined acknowledgement time and the predetermined delays of the buddy device that correspond to the threshold values are established so that buddy devices closest to the out of range device (i.e., with the highest received signal quality) are provided a first opportunity to relay. If an acknowledgement is not received within a certain predetermined time, the relay message is sent by buddy devices which detected a signal quality lower than the first threshold. In one embodiment, only one signal quality threshold is used (thus dividing the buddy devices into two groups—an early relay group and a delayed relay group). In another embodiment, multiple thresholds and delays may be employed.

Turning now to the figures, in a discreet message packet based radio network, one objective of the system is to improve the range and/or reach difficult coverage areas by repeating messages through 2-way end-points. Another objective is to eliminate routing by point identity. Therefore, in one embodiment of the invention, any qualifying 2-way end-point which is in range and that receives the message to be repeated will queue the message for re-transmission. This does not require learning, storing or adapting complex message routing tables. In order to reduce simultaneous re-transmissions from in-range 2-way devices, the re-transmission time can be randomized or skewed by other means.

As shown in FIG. 1, Out of Range Devices (ORDs) send a message that is received by one or more Buddies ($B_1$-$B_n$) which are 2-way endpoints. The 2-way endpoints, once their queued re-transmission time is reached, re-transmit the ORD's message to an 'up-line' transceiver, a collector tower or other collector.

To reduce the chance of collision and on-air repeated message traffic, the 'up-line' transceiver (such as a tower or collector), T in FIG. 1, acknowledges that it received the message by transmitting an acknowledgement message that contains the ID of the initiating device. This acknowledgement message in turn extinguishes all pending repeat messages that match the ID of the initiating device.

Figure 2:
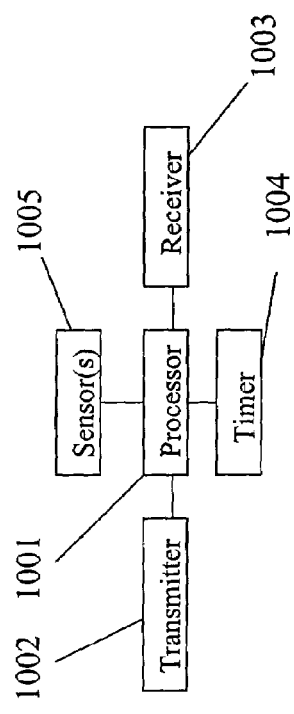
FIG. 2 is a simplified block diagram of one embodiment of a Buddy transceiver (repeater) according to the present invention.

FIG. 2 shows a block diagram of ORD's and Buddy devices. ORD's consist of, at a minimum, a processor 1001, and transmitter 1002. Optionally, ORD's may contain a receiver 1003, timer 1004, and or sensors 1005. Buddy devices consist of, at a minimum, a processor 1001, and transmitter 1002 and receiver 1003. Optionally, Buddy devices may contain a timer 1004, and or sensors 1005. A processor is typically a microprocessor or microcontroller that may contain Random Access Memory (RAM), Read Only Memory (ROM), Electrically Erasable Read Only Memory (EEROM), a Central Processing Unit (CPU) and processes instructions programmed according to the teachings of the invention and operates on data structures, tables, records, or other forms of data. The processor 1001 is connected to and communicates to all other blocks in the ORD. The transmitter 1002 is capable of modulating messages sent by the processor and sending out wireless messages to other devices. The receiver 1003 is capable of demodulating wireless radio messages sent by other devices and passing them to the processor for further processing. The timer 1004 is used by the processor to schedule times for wireless transactions and other housekeeping functions such as reading data from equipment attached to sensors 1005. The sensor(s) 1005 is (are) interface(s) that allow the processor 1001 to sample the environment around ORD's and Buddy devices.

Figure 3:
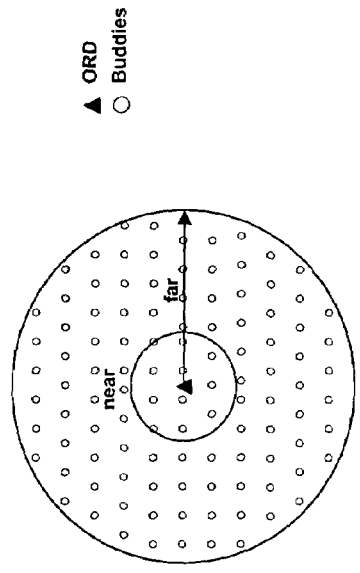
FIG. 3 is a geographic representation of a mode of operation of one embodiment of the present invention.

To further reduce the number of collisions and/or message traffic from re-repeats it must first be recognized that a radio signal propagates in a sphere—a circle if the receivers are on the ground as shown in FIG. 3. There are exponentially more receivers at the perimeter of the circle than at its center as the area covered (A) increases as the square of the distance from the device to be repeated by $A=\Pi R^2$. So it is desirable to give the small number of repeaters at the closer to the device to be repeated an advantage over the ones at the perimeter, in order to reduce collisions and message traffic from re-repeats.

Therefore the in-range 2-way end-point (IREP), also measures received signal strength, signal to noise ratio (SNR) or a like parameter of signal quality (signal quality). The IREP inversely weights signal quality, to maximum transmit delay. The closest (& fewest) IREPs automatically repeat the message more quickly and the up-line (tower, collector or the like) receiver acknowledges and extinguishes the vast majority of IREPs that have not reached their longer time out. It should also be noted that since all of the in range Buddies are capable of hearing and repeating the message, that N-branch diversity against fading is achieved. By contrast a mesh system typically has assigned single receiver node point of contact, which achieves no fading diversity for a single transmission.

In addition, it is also possible to reduce the number of repeated messages from repeaters with low SNR to next tier of the communications system, in the preferred embodiment, often a tower or collector. When the two-way device communicates with the next tier, often a tower or collector, the two-way device stores an indication of link margin (signal strength, SNR, % throughput, quieting or the like).

An inverse weighing function may also be used, such that a better link margin is able to respond to a repeat request faster than a low link margin two-way device. Alternative weighting functions can be based on signal quality including parabolic functions, non-linear curve weighting, and weighting that favors Buddies that are not immediately next to the ORD such to improve the likelihood that the repeated Buddy message is sufficiently distant from the ORD to have a unique path to the tower or collector.

As a further refinement, the next tier of communications may have multiple nodes that can receive a repeated message. In one embodiment the next tier is typically a tower or collector based transceiver and this transceiver acknowledges the repeated message to minimize multiple repeats. As an improvement the next tier sends this acknowledgement message after a short delay that is time skewed or randomized up to N seconds, 3 seconds in the preferred Buddy Mode. Therefore if several towers or collectors receive a repeated message their respective acknowledge messages will be less likely to collide.

The acknowledgement message contains an indication of link quality in as a part of its data payload.

This inverse SNR/signal quality repeat delay method is also applicable to mobile radio systems such that when mobile interrogator sends a broadcast poll to local devices, the closest devices respond the quickest, thereby reducing the probability of RF collisions from more distant devices and allows for more polls and/or more resend power (from a meter).

Alternatively, a meter or remote endpoint can be set to various mPass transmit power levels to purposely reduce its reach. This feature is essentially an inverse squelch function.

It should be understood by one skilled in the art that variations of the above invention can be used in other network topologies both with and without the use of tower or collector based transceivers and that the invention can be used in systems utilizing 'N' tiers as-is and/or removing the inverse function from the time waiting therefore maximizing message repeat distance.

An advantage of this system over mesh type architectures is that the end-points, Buddies & Out of Range Devices (ORDs), are "memory-less". All states & paths are automatically achieved with little RF communications overhead. This eliminates system lock-ups, or lost messages due to lost or no longer applicable path conditions. A mesh system requires time to re-configure after a mass down-time failure.

As a specific implementation of the instant invention, consider a system for wirelessly reading utility meters in a city. Utility meters in the city are connected to devices which can read utility consumption from the meter then transmit that data wirelessly, a Wireless Meter Reading Device (WMRD). In the system, messages flow from WMRD's to the Up-line Transceiver Towers (ULTT's) which can be 7 to 10 miles away from the WMRD's. ULTT's are usually co-located with pre-constructed Cellular Communications Towers or other elevated infrastructure. Wireless messages use a narrowband multi-level Frequency Shift Keyed (FSK) or filtered Minimum Shift Keyed (GMSK) modulation format. The messages can be interleaved, conveloutionally encoded, and or encrypted with post-reception data integrity testable with a Cyclical Redundancy Check (CRC) value. Most WMRD's are 2-way devices capable of operating as Buddy devices which allows the ability to extend range by adding a repeater capability, but without adding additional repeater hardware. The repeater function is intrinsic to the network without requiring specialized repeater hardware. WMRD's usually operate by sending messages directly to ULTT's, but, when WMRD's are out of range, shaded, or otherwise unable to directly communicate with ULTT's, they can be configured to transmit in a special Message Pass (MPass) mode.

mPass mode may use GMSK modulation instead of n-FSK and can be received by other 2 way WMRD's acting as Buddies. mPass messages also may use a different radio frequency than normal mode FSK messages to reduce loading in a specific channel. An mPass message is received by all Buddy WMRD's in range and queued to be repeated by all that receive it. In the preferred embodiment messages are queued between 0 and 120 seconds with the actual time delay being inversely proportional to the SNR of the mPass message as detected by each individual Buddy WMRD plus a pseudo-random dither time. Buddy WMRD devices repeat message using a normal WMRD to ULTT multi-level FSK modulation mode. In the preferred embodiment, after the first Buddy WMRD to timeout repeats its queued message to the ULTT(s), the ULTT(s) pseudo-randomly delay between 0 and 3 seconds to avoid colliding with other ULTTs and then transmit an mPass acknowledgement message that is receivable by Buddy WMRDs which contains the ID of the ORD which sent the original mPass message. When a Buddy WMRD receives an acknowledgement message that has an ID matching one of it's queued messages, it deletes the message from the queue which has the effect of preventing already repeated messages from being repeated again.

To send messages back to the ORD, the ULTT or a back end processor connected to all UUTTs keeps a data base for each WMRD containing the best performing Buddy WMRD's that have repeated messages from the ORD as well as the best performing ULTTs from the perspective of the ORD. When a message needs to be sent to the ORD, the data base is accessed and the best Buddy is looked up based on the data base which is automatically dynamically updated my monitoring repeated messages from Buddy(s) repeating the ORD. A message is broadcast by the tower or collector to all Buddy endpoints in a selective repeat mode such that only the appropriate Buddy repeats the outbound message. If the ORD is in signal range of that Buddy it will receive the repeated message. If this fails, the system can re-send the broadcast message, and, upon some threshold of failed attempts, put the next best alternative Buddy in the selective repeat mode until there is success. Alternatively, the last Buddy that repeated the ORD can be used to selectively repeat an outbound message to an ORD.

In the case where there is no historical data from an ORD, such as with a newly installed remote device, or a moved device, or a device in motion, then the following alternative can be used. At the time of installation, the Latitude and Longitude of each WMRD or Buddy is stored in the WMRD or Buddy or a separate data base. Upon the outbound tower or collector down link failing to communicate with an endpoint (thus it becoming an ORD) then the central processor or ULTT can use this Latitude and Longitude information to compute and choose the physically closest Buddy in proximity to the ORD. Since closest proximity does not necessarily directly correlate to best signal path, several tries with other nearby Buddies may be required.

The advantages to this selective repeat mode Buddy method is that the data base is not distributed, it is located in one controlled area. It is controlled at one point at the head-end and is therefore can be made unconditionally stable. Further, as selective repeat Buddy algorithms are optimized in the future, they can be readily upgraded and controlled (vs. hundreds of thousands of mesh type endpoints) and system cost is held low since more sophisticated hardware is not required at each WMRD.

FIG. 4 describes the steps involved in Buddy message operation, These Steps include: step 1) ORD device 500 initiates an mPass Message. That message is sent to all in-range Buddy Devices noted as $B_1$-$B_7$; step 2) All in-range Buddies B1-B7 including 501 store the incoming mPass message and also start an internal timer. The timer follows a weighting function, in the preferred embodiment, a time delay before repeat of ORD message $\propto ((1/SNR) \times 100\ s)) + 6\ s$ Dither. In this example, in step 3, $B_7$ 501 has the highest SNR and times-out first. In step 4, B7 then repeats the mPass message which included the ID, Identification address, of the initiating ORD. When retransmitted by a Buddy a message is often referred to as a "Buddy Message." This method helps insure that the Buddy that is most likely to succeed transmits first. In step 5, a tower or other data collector 502 then receives the incoming Buddy message. In step 6, the tower 502 or other data collector then broadcasts a Buddy Acknowledge message, including the ID of the ORD. In a multiple tower or collector system, the tower will delay for a random time interval so that two towers do not acknowledge at the same time, thus avoiding a message collision. In a preferred embodiment, a 3 second maximum time delay is utilized. Other delays can be used as well. In addition to time delays, other optimizations of the tower acknowledge message can be applied. Examples of these alternative optimizations are described in the paragraphs that follow the description of this method.

In step 7, all Buddies B1-B7 with pending mPass messages that match the ORD ID in the tower Acknowledge message clear the pending mPass message. This eliminates message traffic that would be present on a prior art repeater that repeats all messages. Note, the Buddy operation runs concurrently with the normal operation of the Buddy's other functions, such as metering.

The previously described method is very robust in the presents of any path failure. In step 8, if the message from B7 501 failed to be received by tower 502 then no Acknowledge message would have been generated by tower 502. Thus, $B_4$, with the second best SNR from the ORD 500 will automatically repeat the ORD mPass message. This broad physical distribution of potential return paths from Buddies also provide N-branch spatial diversity (where N is equal to the number of in-range Buddies). This is a very powerful solution to signal fading and shading. By contrast, a Mesh system tends to have one-on-one relationships with in-range transceiver devices, which means that the initiating ORD device would have to re-try and start a new communications attempt sequence.

Typically, in large systems, there will be two or more towers 502 or data collectors in range of the Buddy devises. The below listed Alternative methods can be used to select the most appropriate tower 502 to Acknowledge a Buddy message. In addition, because of collisions and fading many times 2 towers will Acknowledge a Buddy message. Further, this can be positive as this will help insure that all pending Buddy messages get extinguished and therefore help to prevent a needless repeat of a message from a Buddy such as 503. If Buddy 503 failed to hear an Acknowledge message from tower 502.

Lastly, since multiple Acknowledges can be beneficial to large scale systems, any of the Acknowledge algorithms can be adjusted so that tower/collector Acknowledge messages will be sent from two towers/collectors. This can be readily accomplished for example, by requiring that the tower/collector Acknowledges are heard before a tower/collector clears its pending Acknowledge message to the Buddies.

As noted previously, there are alternatives to the above-described tower optimization method.

In alternative method 1, tower 502 listens for an Acknowledge from other towers or collectors once it receives a Buddy message and its own timer is running. If an Acknowledge is heard from an other tower 502 or collector then the pending Acknowledge it terminated.

In alternative method 2, it is possible to set a threshold for each tower 502 such that below the SNR threshold the tower does not Acknowledge.

In alternative method 3, a form of CSMA is used such that tower 502 will hold off a transmission while an other tower transmission is in the process of being transmitted. CSMA allows the tower 502 to listen for message data and/or its received signal strength (RSSI). Before the tower 502 sends an Acknowledge message, the tower listens first. To prevent an indefinitely long hold off period caused by a high RSSI, if RSSI is below a threshold indicating there is no competing tower message transmission then tower 502 transmits the Acknowledge. Regardless, if RSSI above the threshold for more then a predetermined time (on the order of ms to seconds thus indicating that other tower or collector may be acknowledging), then tower 502 still transmits the Acknowledge to insure that an Acknowledge is always being generated.

In alternative method 4, synchronization is designed to occur at a higher level overall Network Controller.

Advantages associated with these alternative tower optimization methods include: a) the method scales even when there are "M" towers/tower gateway base stations (TGBs); b) the previously described 3 second delay to ACK may be reduced; and c) there are fewer chances of Acknowledge message collisions.

It should be noted that in any multi tower 502 multi-collector system on ALL the above methods the tower 502 that gets best SNR should Acknowledge first. The strongest tower 502 has highest likelihood of extinguishing ALL of the pending mPass messages in Buddy devices. To facilitate this function the towers can use a similar inverse SNR weighting function as used by the Buddies themselves. This is a general method which can be applied to numerous communications networks.

The present invention includes processing of received signals, and programs by which the received signals are processed. Such programs are typically stored and executed by a programmed computer processor. The processor typically includes a computer program product for holding instructions programmed and for containing data structures, tables, records, or other data. Examples of computer program products are computer readable media such as compact discs, hard disks, floppy disks, tape, magneto-optical disks, PROMs (EPROM, EEPROM, flash EPROM), DRAM, SRAM, SDRAM, or any other magnetic medium, or any other medium from which a processor can read. As such, the present invention can be configured to work with a computing device to manage one or more of the previously described operations. An overview of basic computer features and operations is found in the text "How Computers Work, Millennium Edition", by Ron White, Que Publishing, a division of MacMillan Computer Publishing USA, 1999, the entire contents of which being incorporated herein by reference.

The invention claimed is:

1. A method for relaying packet information from an Out of Range Device (ORD) to a communications tower or other relay device, comprising:
   receiving a message from the ORD, said message recognizable by a transceiver device as a message to be repeated;
   storing the message in said transceiver device;
   measuring, by said transceiver device, a received signal quality of the message;
   relaying said message from said transceiver device after delaying for a time interval inversely proportional to received signal quality;
   monitoring at said transceiver device, during said time interval and prior to the relaying, for an acknowledgement from said communications tower or from another transceiver device, said acknowledgement indicating that the message was received by said communications tower or said another transceiver device; and
   deleting said message from a queue upon receipt of said acknowledgement during said time interval.

2. The method of claim 1, further comprising:
   relaying said received signal quality or another parameter from said transceiver device;
   determining a preferred return path from said communications tower or said another transceiver device to the ORD.

3. The method of claim 1, wherein said signal quality comprises at least one of:
   signal strength,
   signal to noise ratio (SNR),
   receiver quieting,
   bit error rate (BER),
   packet success rate, and
   modulation "eye".

4. The method of claim 1, wherein said transceiver device comprises a first and second mode of operation, said first and second modes of operation being one of a mode set by an operator upon installation, a mode set or changed via a wireless command, and a mode autonomously selected as a result of loss of communication with the tower or other relay device.

5. The method of claim 4, wherein said first mode of operation comprises periodically or randomly sending sensor data directly to the tower or other relay, and said second mode of operation comprises periodically or randomly sending the sensor data to the tower or other relay via another device.

6. The method of claim 5, wherein said first and second modes differ in at least one of frequency, modulation, and/or message format.

7. The method of claim 6, wherein the second mode includes GMSK modulation.

8. The method of claim 1, wherein
   said step of relaying said message from said transceiver device after delaying for a time interval inversely proportional to received signal quality comprises:
   monitoring for an acknowledgement from another device; and
   terminating said step of relaying without transmission if said acknowledgement is detected.

9. The method of claim 1, wherein said step of relaying said message from said transceiver device after delaying for a time interval inversely proportional to received signal quality comprises:
   setting a signal to noise threshold such that below the signal to noise threshold the acknowledgement is not sent.

10. The method of claim 1, wherein said step of relaying said message from said transceiver device after delaying for a time interval inversely proportional to received signal quality comprises:
    synchronizing with a Network Controller.

11. A relay device configured to relay packet information from an Out of Range Device (ORD) to a communications tower or other relay device, comprising:
    a receiver configured to receive a message recognizable as a message to be repeated;
    a queue configured to store the message;
    a measurement device configured to measure a received signal quality of the message;
    a timer configured to delay a relay of said message for a time interval determined by a formula based on received signal quality; and
    a transmitter configured to transmit said message, said formula based on received signal quality comprising one of
    an inverse weighting function,
    a parabolic weighting function,
    a non-linear curve weighting function, and
    a weighting function that favors transceivers that are not immediately next to the ORD such to improve the likelihood that a repeated message is sufficiently distant from the ORD to have a unique path to the tower or collector.

12. The relay device of claim 11, further comprising:
    a monitor configured to monitor, during said time interval, for an acknowledgement from said communications tower or from another transceiver device, said acknowledgement indicating that the message was received by said communications tower or said another transceiver device.

13. The relay device of claim 11, wherein said signal quality comprises at least one of:
    signal strength,
    signal to noise ratio (SNR),
    receiver quieting,
    bit error rate (BER),
    packet success rate, and
    modulation "eye".

14. The relay device of claim 11, further comprising:
    a first and second mode of operation, said first and second modes of operation being one of a mode set by an operator upon installation, a mode set or changed via a wireless command, and a mode autonomously selected as a result of loss of communication with the tower or other relay device.

15. The relay device of claim 14, wherein said first mode of operation comprises periodically or randomly sending sensor data directly to the tower or other relay, and said second mode of operation comprises periodically or randomly sending the sensor data to the tower or other relay via another device.

16. The relay device of claim 15, wherein said first and second modes differ in at least one of frequency, modulation, and/or message format.

17. The relay device of claim 16, wherein the second mode includes GMSK modulation.

18. The relay device of claim 11, further comprising:
a queue configured to queue said message between 0 and 120 seconds with the actual time delay being inversely proportional to a received SNR plus a pseudo-random dither time.

19. The relay device of claim 18, wherein said pseudo-random dither time is 0-3 seconds.

20. The relay device of claim 11, comprising:
a monitor configured to monitor for an acknowledgement from another device; and
a control device configured to terminate operations without transmission if said acknowledgement is detected.

21. The relay device of claim 11, comprising:
a threshold setting device configured to set a signal to noise threshold such that below the signal to noise threshold the acknowledgement is not sent.

22. The relay device of claim 11, comprising
a monitor configured to monitor via carrier sense multiple access communications for at least one of a communication and a corresponding received signal strength from another device; and
a controller configured to cause said transmitter to transmit said acknowledgement if said received signal strength is below a predetermined threshold, and if said received signal strength is below a predetermined threshold for more then a predetermined time, to transmit the acknowledgement.

23. The relay device of claim 11, wherein said step of relaying said message after delaying for a time interval inversely proportional to received signal quality comprises:
synchronizing with a Network Controller.

24. A method for relaying packet information from an Out of Range Device (ORD) to a communications tower or other relay device, comprising:
receiving a message from the ORD, said message recognizable by a transceiver device as a message to be repeated;
storing the message in said transceiver device;
measuring, by said transceiver device, a received signal quality of the message;
relaying said message from said transceiver device after delaying for a time interval inversely proportional to received signal quality; and
said relaying said message further comprises queuing said message between 0 and 120 seconds with the actual time delay being inversely proportional to a received SNR plus a pseudo-random dither time.

25. The method of claim 24, wherein said pseudo-random dither time is 0-3 seconds.

26. A method for relaying packet information from an Out of Range Device (ORD) to a communications tower or other relay device, comprising:
receiving a message from the ORD, said message recognizable by a transceiver device as a message to be repeated;
storing the message in said transceiver device;
measuring, by said transceiver device, a received signal quality of the message;
relaying said message from said transceiver device after delaying for a time interval inversely proportional to received signal quality; and
said relaying said message further comprises
communicating via carrier sense multiple access,
monitoring for at least one of a communication and a corresponding received signal strength from another device,
transmitting said acknowledgement if said received signal strength is below a predetermined threshold, and
if said received signal strength is below a predetermined threshold for more then a predetermined time, transmitting the acknowledgement.

27. A method for relaying packet information from an Out of Range Device (ORD) to a communications tower or other relay device, comprising:
receiving a message from the ORD, said message to be repeated;
storing the message;
measuring a received signal quality of the message;
relaying said message after delaying for a time interval weighted as a function of said received signal quality;
monitoring at said transceiver device, during said time interval and prior to the relaying, for an acknowledgement from said communications tower or from another transceiver device, said acknowledgement indicating that the message was received by said communications tower or said another transceiver device; and
deleting said message from a queue upon receipt of said acknowledgement during said time interval.

28. A method for relaying packet information from an Out of Range Device (ORD) to a communications tower or other relay device, comprising:
receiving a message from the ORD, said message to be repeated;
storing the message;
measuring a received signal quality of the message;
relaying said message after delaying for a pseudo-random or random time interval;
monitoring at said transceiver device, during said time interval and prior to the relaying, for an acknowledgement from said communications tower or from another transceiver device, said acknowledgement indicating that the message was received by said communications tower or said another transceiver device; and
deleting said message from a queue upon receipt of said acknowledgement during said time interval.

29. A method for relaying packet information from an Out of Range Device (ORD) to a communications tower or other relay device, while minimizing unnecessary repeated message traffic comprising:
transmitting a message from the ORD, said message including an ID of the ORD, said message recognizable by a transceiver device as a message to be repeated;
storing the message and ORD ID in storage medium of said transceiver device;
timing by said transceiver device for a time interval, said time being one of a pseudo random time and an assigned time uniquely related to the transceiver device and other time scattering method;

relaying said stored message by said transceiver device after delaying for said time interval;

upon receipt by a tower collector or other collector, the tower or other collector broadcasting an acknowledge message which includes the ID of the ORD; and any other transceiver device still timing and holding the ORD message in a corresponding storage medium, comparing the ID of the ORD in the acknowledge message and erasing any message that includes an ORD ID that matches the ORD ID of the acknowledge message.

30. A computer program product storing computer program instructions, which when executed by a computer, causes the computer to execute the following steps:

receiving a message from the ORD, said message recognizable by a transceiver device as a message to be repeated;

storing the message in said transceiver device;

measuring, by said transceiver device, a received signal quality of the message;

relaying said message from said transceiver device after delaying for a time interval inversely proportional to received signal quality;

monitoring at said transceiver device, during said time interval and prior to the relaying, for an acknowledgement from said communications tower or from another transceiver device, said acknowledgement indicating that the message was received by said communications tower or said another transceiver device; and deleting said message from a queue upon receipt of said acknowledgement during said time interval.

31. A computer program product storing computer program instructions, which when executed by a computer, causes the computer to execute the following steps:

receiving a message from an out-of-range device (ORD), said message to be repeated;

storing the message;

measuring a received signal quality of the message;

relaying said message after delaying for a time interval weighted as a function of said received signal quality;

monitoring at said transceiver device, during said time interval and prior to the relaying, for an acknowledgement from said communications tower or from another transceiver device, said acknowledgement indicating that the message was received by said communications tower or said another transceiver device; and deleting said message from a queue upon receipt of said acknowledgement during said time interval.

32. A computer program product storing computer program instructions, which when executed by a computer, causes the computer to execute the following steps:

receiving a message from an out-of-range device (ORD), said message to be repeated;

storing the message;

measuring a received signal quality of the message;

relaying said message after delaying for a pseudo-random or random time interval;

monitoring at said transceiver device, during said time interval and prior to the relaying, for an acknowledgement from said communications tower or from another transceiver device, said acknowledgement indicating that the message was received by said communications tower or said another transceiver device; and deleting said message from a queue upon receipt of said acknowledgement during said time interval.

33. A method for relaying packet information from an Out of Range Device (ORD) to a communications tower or other relay device, comprising:

receiving a message from the ORD, said message recognizable by a transceiver device as a message to be repeated;

storing the message in said transceiver device;

measuring, by said transceiver device, a received signal quality of the message;

relaying said message from said transceiver device after delaying for a time based on received signal quality comprising one of an inverse weighting function, a parabolic weighting function, a non-linear curve weighting function, and a weighting function that favors transceivers that are not immediately next to the ORD to improve a likelihood that a repeated message is sufficiently distant from the ORD to have a unique path to the tower or collector.

* * * * *